United States Patent
Duh et al.

(10) Patent No.: US 6,461,575 B1
(45) Date of Patent: Oct. 8, 2002

(54) APPARATUS FOR CRYSTALLIZATION OF POLYTRIMETHYLENE TEREPHTHALATE

(75) Inventors: Ben Duh, Tallmadge, OH (US); Ye-Mon Chen, Sugar Land, TX (US); Ann Marie Corey, Akron, OH (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/309,921

(22) Filed: May 11, 1999

(51) Int. Cl.⁷ .................................................. B01D 9/00
(52) U.S. Cl. ................................................... 422/245.1
(58) Field of Search ..................... 422/245.1, 255, 422/261, 275, 292; 23/295 R, 299

(56) References Cited

U.S. PATENT DOCUMENTS

| | | | |
|---|---|---|---|
| 3,661,330 A | * 5/1972 | Yamada et al. | 241/65 |
| 4,265,740 A | * 5/1981 | Luthi | 209/159 |
| 5,532,335 A | 7/1996 | Kimball et al. | 528/495 |
| 5,540,868 A | 7/1996 | Stouffer et al. | 264/13 |
| 5,763,104 A | 6/1998 | Stouffer et al. | 528/503 |

FOREIGN PATENT DOCUMENTS

WO  WO 97/23543  7/1997  .......... C08G/63/88

* cited by examiner

Primary Examiner—Benjamin L. Utech
Assistant Examiner—Donald L. Champagne

(57) ABSTRACT

The pelletized product of melt condensation polymerization of 1,3-propanediol and terephthalic acid is crystallized in a vessel designed for continuous fluidized bed flow of the pellets in water at a temperature within the range of about 65 to about 100° C. Hot-water treatment in the vessel permits crystallization of the pellets in a continuous operation and results in an increase of the crystallinity of the polymer to greater than about 35% and an increase in pellet density.

1 Claim, 6 Drawing Sheets

Density of PTT after Being Crystallized in Hot Water under Various Conditions

Crystallinity of PTT after Being Crystallized in Hot Water under Various Conditions

APPARATUS FOR CRYSTALLIZATION OF POLYTRIMETHYLENE TEREPHTHALATE

BACKGROUND OF THE INVENTION

This invention relates to the preparation of 1,3-propanediol-based polyesters such as polytrimethylene terephthalate. In one aspect, the invention relates to apparatus for the continuous crystallization of polytrimethylene terephthalate.

Polytrimethylene terephthalate is a polyester useful in fiber applications in the carpet and textile industries. The manufacture of polytrimethylene terephthalate involves the melt condensation polymerization of 1,3-propanediol and terephthalic acid to a polymer having an intrinsic viscosity (IV) of about 0.5 to 1.0 dl/g. The polymer melt is discharged from the bottom of the melt reactor and extruded through an extrusion die into strands. The strands are quenched in cold water and cut into pellets for storage or transportation.

It has been found that polytrimethylene terephthalate pellets tend to stick together, or "block," during storage or shipping at temperatures above the polymer Tg (about 45° C.), which can be exceeded during the summer in a silo or rail car. Agglomeration of the pellets complicates and increases the cost of handling the pellets. Applicants have found that partially crystallized polytrimethylene terephthalate pellets are less susceptible to blocking, and applicants have developed a process for partial crystallization of polytrimethylene terephthalate pellets. It would be desirable to practice such a process in the continuous polymerization of polytrimethylene terephthalate.

It is therefore an object of the invention to provide apparatus for crystallizing polytrimethylene terephthalate pellets in a continuous polymerization process.

BRIEF SUMMARY OF THE INVENTION

According to the invention, the polyester product of condensation polymerization of 1,3-propanediol and terephthalic acid is partially crystallized in a vessel designed to provide immersion of polytrimethylene terephthalate pellets in a continuous moving liquid bed at a temperature within the range of about 65 to about 100° C. for a time effective to achieve a crystallinity of at least about 35% and a pellet density of at least about 1.33 g/cm$^3$.

DETAILED DESCRIPTION OF THE INVENTION

In general, polytrimethylene terephthalate is prepared by reacting, at elevated temperature, a molar excess of 1,3-propanediol with terephthalic acid in a two-stage (esterification/polycondensation) process, for a time effective to produce a polytrimethylene terephthalate having an intrinsic viscosity (measured in 60:40 phenol:tetrachloroethaneat 30° C.) of at least about 0.5 dl/g. The esterification step is carried out at a temperature within the range of about 230 to about 300° C., preferably about 240 to about 270° C., under elevated pressure, preferably under nitrogen gas, within the range of about 20 to about 200 psi, preferably about 50 psi. Excess 1,3-propanediol and byproduct water are removed by suitable means such as overhead distillation as the esterification proceeds.

The esterification product, a low IV prepolymer, is then polycondensed under vacuum in the presence of a catalyst while removing byproduct water. Suitable polycondensation catalysts include compounds of titanium or tin, such as titanium butoxide, present in an amount within the range of about 10 to about 400 ppm titanium or tin, based on the weight of the polymer. The polymerization conditions are selected so as to produce a molten polyester having a target intrinsic viscosity of at least about 0.5 dl/g.

The polytrimethylene terephthalate is discharged from the melt reactor and passed through an extrusion die to form polymer melt strands which are cooled and partially solidified by contact with cold water on a strand guide. The sequence of pelletization/crystallization is not critical. Pre-pelletizing crystallization involves immersion of polymer melt strands in hot water prior to cutting of the strands, preferably en route from the extruder to the pelletizer. The preferred method, however, for process efficiency and pellet quality, is to conduct crystallization downstream of pelletization.

Figure 1:
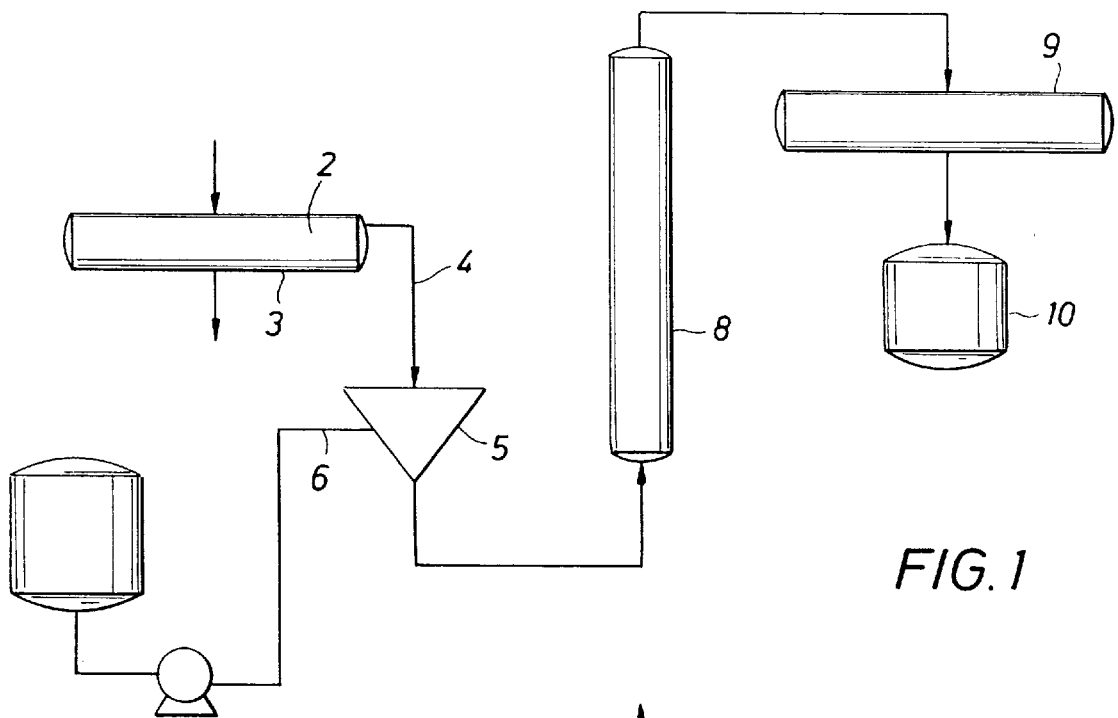
FIG. 1 is a schematic flow diagram of a continuous polytrimethylene terephthalate preparation process employing the invention apparatus.

Immediately after pelletization, the surfaces of the pellets are solid, while the cores are still partially molten. To prevent the pellets from sticking together, the pellets are flushed with additional cooling water and completely solidified. In the embodiment as shown in FIG. 1, the pellets are transported in a water slurry 1 to a dewatering screen 2 to remove most of the water 3. The pellets at this stage are clear and have a low degree of crystallinity. The pellets are then collected in hopper 5, combined with water 6, which can be preheated, and conveyed as a slurry 7 to the top of crystallizer vessel 11. Transport water is separated from the pellets through screen 8 and passed from the crystallizer via 9. The pellets travel in plug flow through the middle portion of the vessel and into a fluidized bed of hot water introduced via 10 into the cone-shaped bottom portion of the crystallizer. Movement of the pellets in the crystallizer is controlled so as to provide the contact time required to impart polymer crystallinity of at least about 35%. The slurry is passed from the crystallizer through screen 12 for water removal, and the pellets are transported via 13 to dryer 14.

Figure 2:
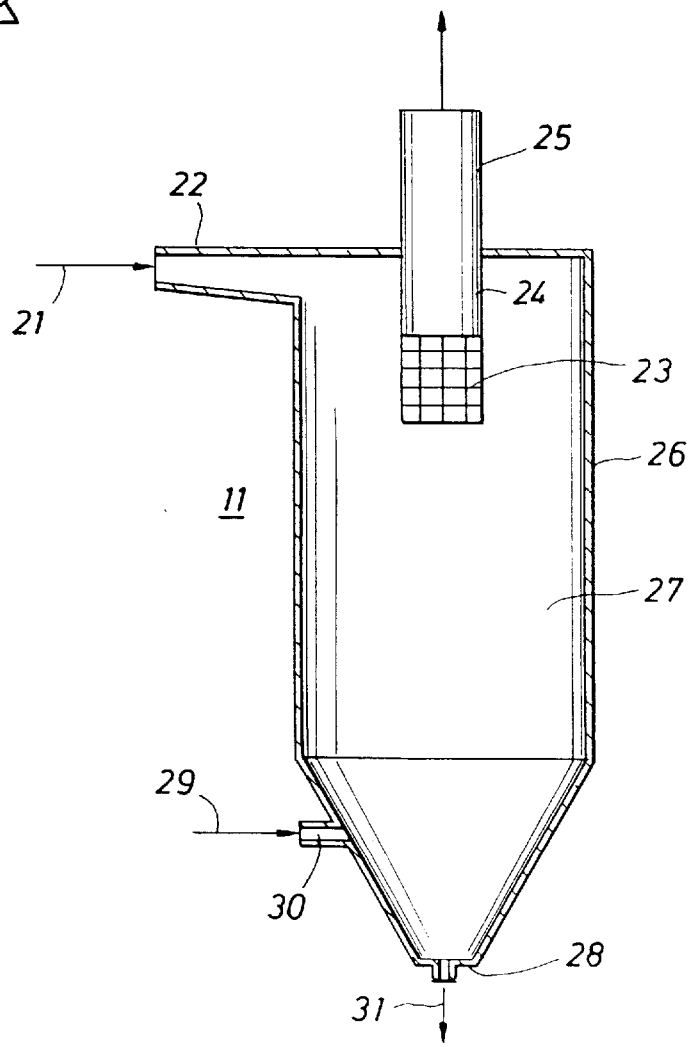
FIG. 2 is a schematic cross-sectional diagram of one embodiment of the invention crystallization apparatus.

The invention is a crystallizer vessel designed for the continuous crystallization of polytrimethylene terephthalate pellets in a liquid moving bed. One embodiment of such a crystallizer is shown in FIG. 2.

A slurry 21 of polytrimethylene terephthalate pellets transported from the pelletizer in hot water is introduced tangentially into vertically-elongated crystallizer vessel 11 via horizontally-oriented entry conduit 22. Tangential introduction of the pellet slurry permits centrifugal separation of the pellets from the water within the interior upper portion of the vessel. In the embodiment shown, the water passes through screen 23, into center tube 24, and out of the tube via exit conduit 25, while the pellets rotate in a descending route along cylindrical crystallizer wall 26. The interior of the crystallizer vessel can be outfitted with baffles if desired. The descending pellets form a slow-moving bed in plug flow as they approach the middle portion 27 of the crystallizer vessel. For optimum flow of crystallized pellets from the crystallizer, it has been found advantageous to have local fluidization near the bottom of the vessel. This can be achieved with a total water flow rate such that the liquid velocity within the bottom cone region is well above the minimum fluidization velocity while the liquid velocity within the upper cylindrical region of the vessel is below the minimum fluidization velocity. The speed of downward movement of the pellet bed is dependent on the speed of pellet discharge at the lower end 28 of the vessel and the flow of incoming hot water stream 29 from a water surge vessel (not shown) into the crystallizer via hot water inlet 30. The incoming water temperature will be within the range of about 65 to about 100° C., preferably about 65 to about 85° C. As the flow of the descending pellets slows, the concentration of pellets in the lower portion of the vessel increases. Because of the low effective pellet weight (pellet weight less liquid buoyancy), the lubricating action of the water, the fast crystallization of polytrimethylene terephthalate and the low crystallization temperatures required, no agglomeration of pellets will occur in the crystallization vessel so long as continuous movement of the pellets is maintained in the liquid in the lower portion of the vessel. The crystallized pellets exit the bottom of the cone and are passed via 31 ato drying and further processing.

The crystallizer vessel will typically have an operating pressure of about 0 to about 5 psig. The size of the vessel will depend upon the operating variables and overall plant capacity. A typical hot water crystallizer in a commercial plant would be in the general range of about 6 to about 10 feet in length, with the cone portion being about 1.5 to about 2 feet of that total length. The pellet residence time will typically range from about 30 seconds to about 5 minutes.

The flow of the pellets through the crystallizer vessel will thus approximately define three regions. In the upper half of the vessel the concentration of pellets will be relatively dilute, with pellet concentration increasing below this level to form a moving bed of pellets in plug flow downward through the lower portion of the vessel at a volume concentration of approximately 50 to about 70 percent. In the lower portion of the cone near the vessel exit, the entering hot water, introduced at a velocity to keep the pellets suspended, forms a fluidized bed of relatively dilute pellet volume concentration of approximately 40%. This local fluidization in the conical area is desirable to facilitate continuous discharge of the crystallized pellets from the vessel. This can be achieved by use of a total water flow rate such that the liquid velocity within the bottom cone region is well above the minimum fluidization velocity, while the liquid velocity within the intermediate region of the vessel is below the minimum fluidization velocity.

Figure 3:
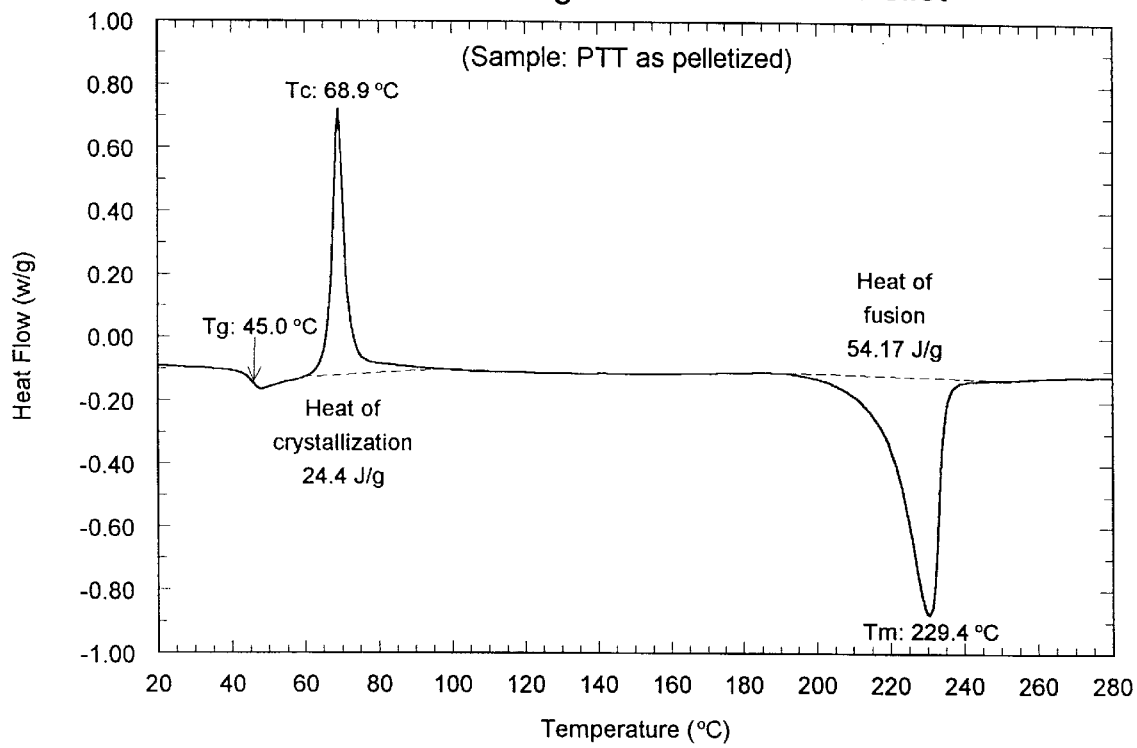
FIG. 3 is a differential scanning calorimetric (DSC) thermogram of a clear, as-pelletized polytrimethylene terephthalate sample, with no additional crystallization.
Figure 4:
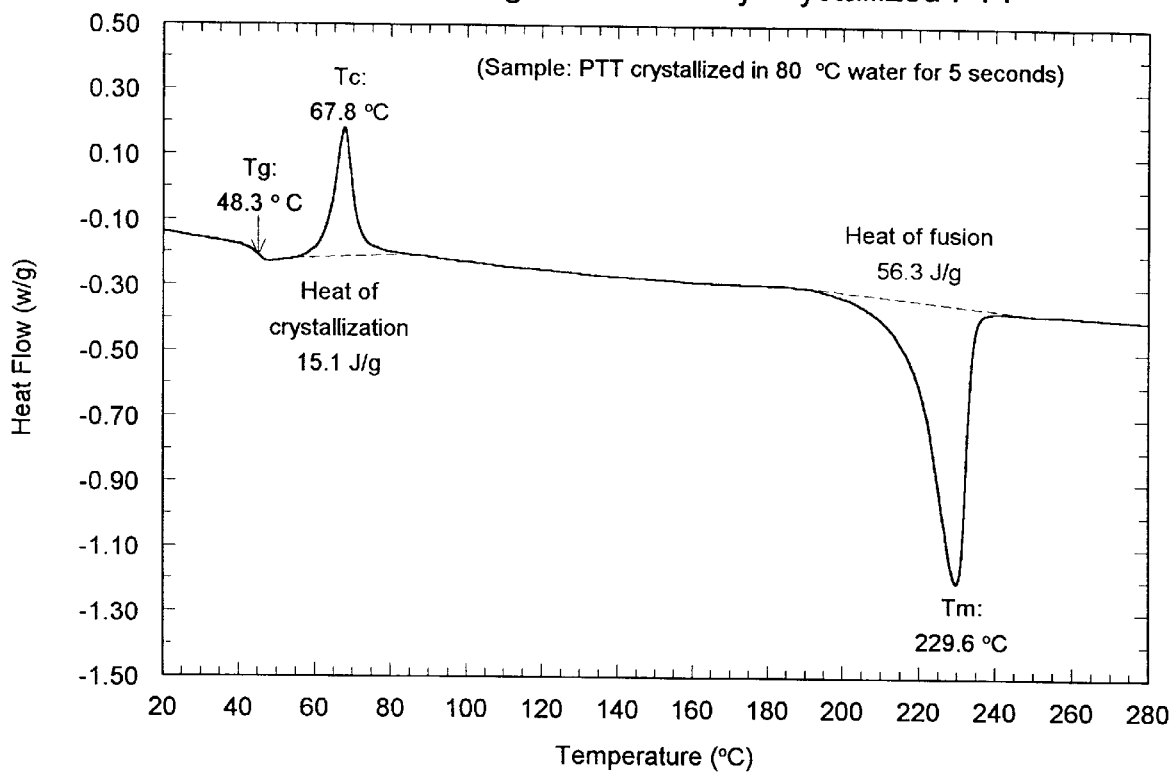
FIG. 4 is a DSC thermogram of a partially-crystallized polytrimethylene terephthalate sample which has been immersed in 80° C. water for 5 seconds.
Figure 5:
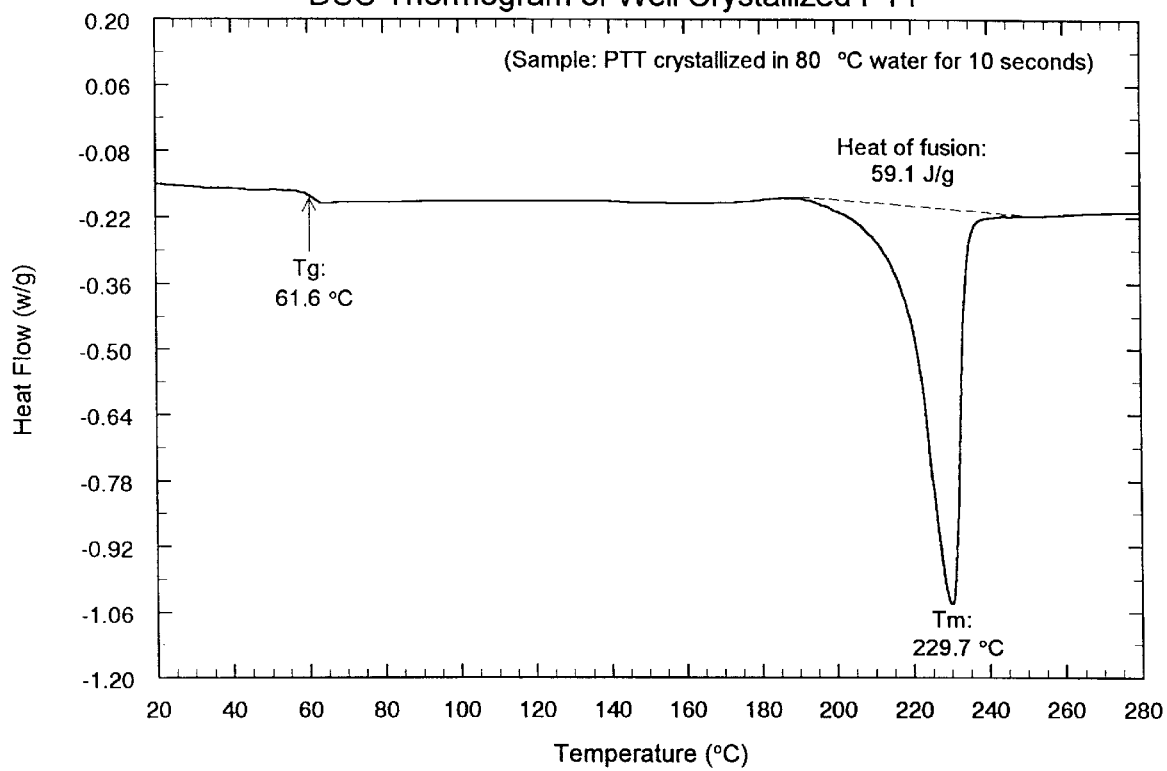
FIG. 5 is a DSC thermogram of a well-crystallized polytrimethylene terephthalate sample which had been immersed in 80° C. water for 10 seconds.
Figure 6:
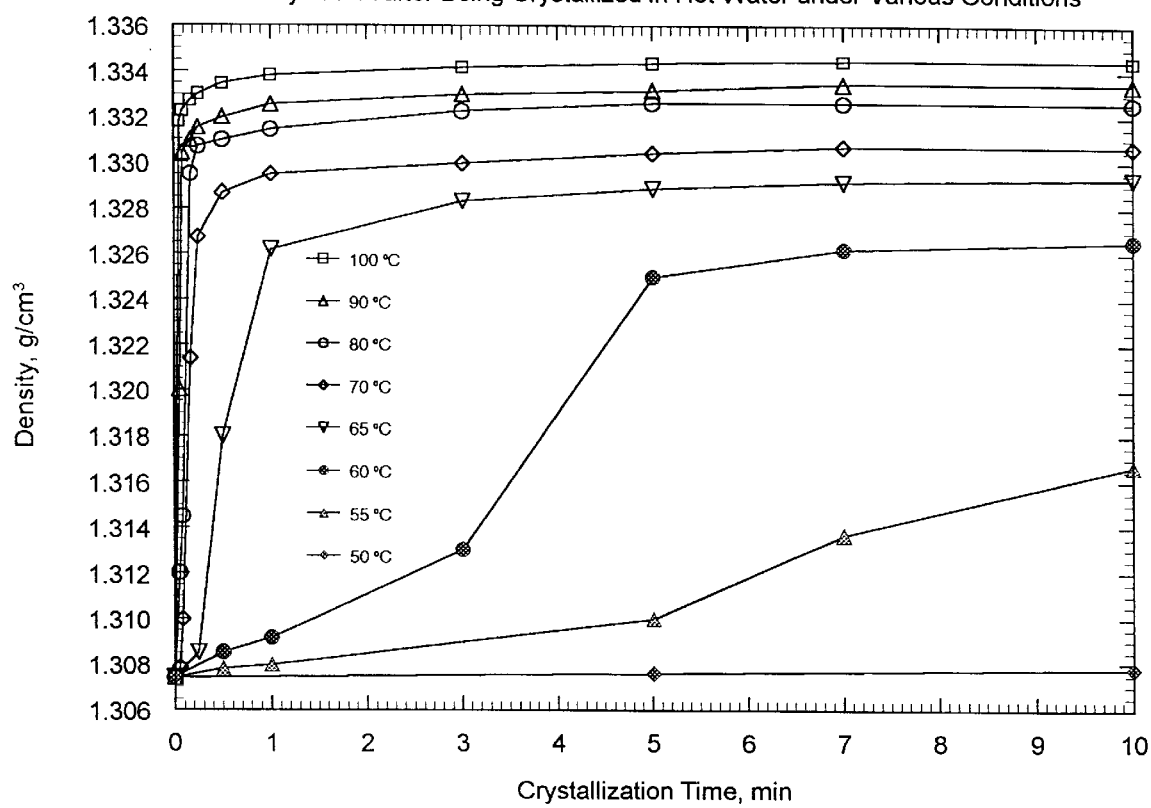
FIG. 6 shows the effects of hot-water immersion time and temperature on the density of polytrimethylene terephthalate.
Figure 7:
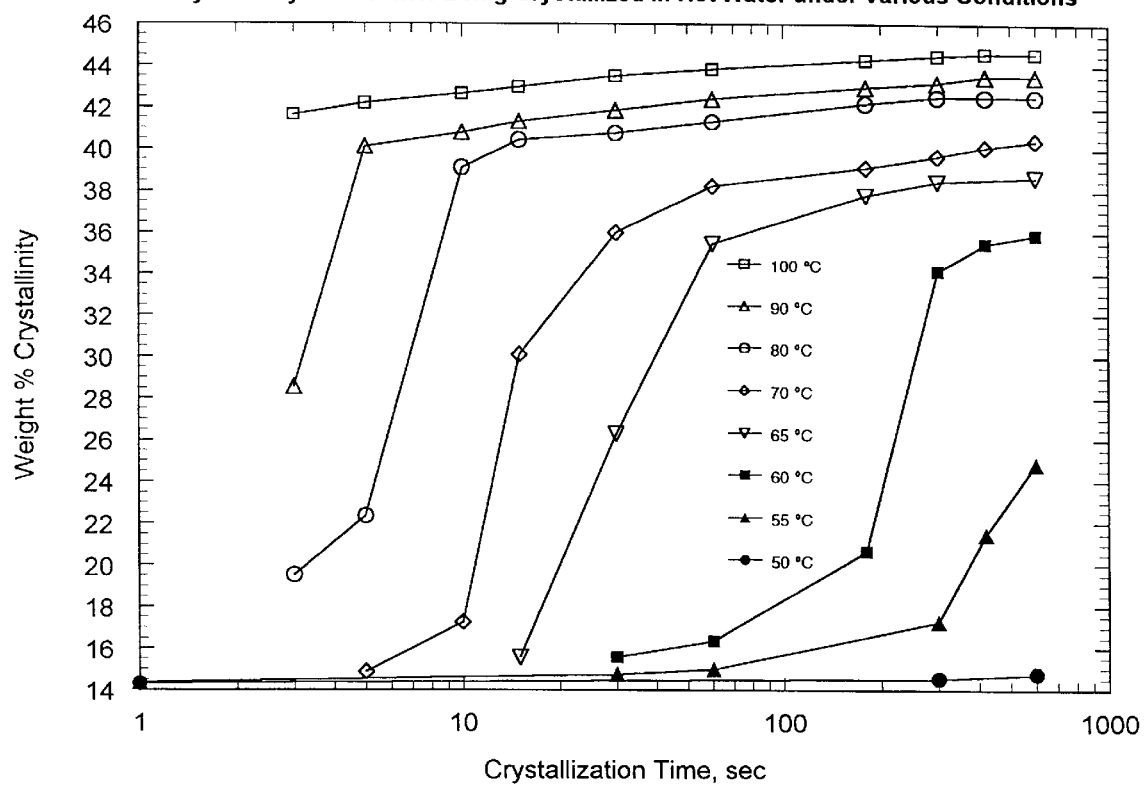
FIG. 7 shows the effects of hot-water immersion time and temperature on the degree of crystallinity of polytrimethylene terephthalate.

To ensure that the pellets are sufficiently crystallized to prevent blocking, it is desirable to crystallize the pellets to the extent that the product does not exhibit a conspicuous cold crystallization peak on its DSC thermogram (see FIGS. 3–5). The imparted degree of crystallization is related to the starting polymer density and IV, the temperature of the water and the length of time the polymer is immersed in the water. The following provides general guidance on immersion times required to achieve greater than 35% crystallinity over the temperature range of 60 to 100° C.

| Water Temperature (° C.) | Crystallization Time |
|---|---|
| 60 | 20 minutes |
| 65 | 3 minutes |
| 70 | 30 seconds |
| 80 | 10 seconds |
| 90 | 5 seconds |
| 100 | 3 seconds |

For commercial operation, the faster crystallization times must be balanced against the cost of maintaining higher water temperatures. The upper temperature is also limited by the tendency of polytrimethylene terephthalate to undergo hydrolytic degradation (IV decrease) at temperatures above about 100° C. For process efficiency and economics, the preferred water temperature is within the range of about 65 to about 85° C. and the polymer is immersed for no longer than 3 minutes, preferably about 3 seconds to about 3 minutes.

After the selected residence time in the crystallizer, the pellet/water slurry is discharged into a pellet dryer. Cooling of the pellets to a temperature below about 60° C. is necessary, either by cold water quench en route to the dryer or, if the dryer environment is sufficiently cool, in the dryer itself.

Polytrimethylene terephthalate pellets crystallized in the invention crystallizer will preferably have an opaque appearance and exhibit the following physical properties:
density of at least about 1.33 g/cm$^3$
crystallinity of at least about 35%
Tg of at least about 60° C.
Apparent crystallite size of at least about 10

As used herein, "crystallinity" refers to an increase in the crystalline fraction and a decrease in the amorphous fraction of the polymer. In general, a crystallinity greater than about 35%, preferably within the range of about 36 to about 45%, is desired. The calculation of crystallinity herein is based on the elationship of volume fractional crystallinity (Xc) of a sample to the density (Ds) of the sample:

$$X_c = (D_s - D_a)/(D_c - D_a)$$

where $D_s$ is the density of the sample, $D_a$ is the density of amorphous PTT (=1.295 g/cm$^3$) and $D_c$ is the density of PTT crystal (=1.387 g/cm$^3$). The weight fractional crystallinity equals $(D_c/C_s) X_c$. Crystallinity can also be estimated from a DSC thermogram, but it has been found that the density method provides more consistent results, and this method has therefore been chosen for designation of fractional crystallinity herein.

The invention crystallizer vessel overcomes the problem of polytrimethylene terephthalate pellets adhering together during hot-weather storage or transportation, and enables drying of the pellets in a hopper-type dryer prior to melt processing or solid-state polymerization. Use of the vessel can also reduce fines generation in the manufacture of polytrimethylene terephthalate. The vessel employs a liquid moving bed for uniform residence time and uniform heating of the pellets, resulting in uniform pellet crystallinity and opacity. The resulting partially-crystallized polymer pellets can be spun into fibers or made into film or engineering thermoplastics.

EXAMPLE 1

Hot-Water Crystallization of Amorphous Polytrimethylene Terephthalate.

Clear pellets of polytrimethylene terephthalate (total weight 5 g) having an IV of 0.904 dl/g, a degree of polymerization (DP) of about 102, and a weight per pellet of about 0.02 g were placed in a wire mesh basket. The basket was placed in a 4L beaker filled with water heated to a constant temperature (as indicated in Table 1) between 50 and 100° C. for a time ranging from 3 seconds to 30 minutes. The water was vigorously stirred over the time of immersion. The basket was removed from the hot water and immediately immersed in iced water to stop crystallization. After drying in the room environment, each sample was tested as described below and the appearance of each sample was noted.

The IV of each treated sample was determined in 60:40 phenol:tetrachloroethane solvent at 30° C. A drop in IV indicates hydrolytic degradation during crystallization in hot water. As can be seen in Table 1, significant IV drops occurred only under the more severe crystallization conditions (e.g., 10 minutes or longer in 90° C. water and 5 minutes or longer in 100° C. water).

Each sample was scanned on a differential scanning calorimeter (DSC) at a rate of 10° C. per minute. Useful DSC data included Tg, heat of fusion and heat of crystallization. From the difference between the heat of fusion and the heat of crystallization on the thermogram, the fractional crystallinity by weight, Sw, of the sample was calculated using 146 J/g for the heat of fusion for crystalline polytrimethylene terephthalate. FIGS. 3, 4 and 5 are DSC thermograms for 3 samples of different degrees of crystallization.

FIG. 3 shows a DSC trace for a clear, as-pelletized polytrimethylene terephthalate sample. It shows a Tg inflection at 45° C., a cold crystallization peak with a peak temperature (Tc) at 68.9° C., and a fusion peak with a peak temperature (Tc) at 229.4° C. From the heat of fusion and heat of crystallization, the crystallinity of the sample was calculated to be 20.4% based on DSC.

FIG. 4 shows a DSC trace of a pelletized polytrimethylene terephthalate sample that had been immersed in 80° C. water for 5 seconds. This DSC trace has a smaller cold crystallization peak than the DSC trace in FIG. 1, reflecting the increased crystallinity of the sample (28.2%). The existence of the cold crystallization peak indicates that crystallization of this sample was incomplete. The Tg of the sample had increased to 48.3° C. as a result of its increased crystallinity.

FIG. 5 is a DSC trace of a pelletized polytrimethylene terephthalate sample that had been immersed in 80° C. water for 10 seconds. This DSC trace does not show a distinct cold crystallization exotherm, indicating that the sample was well crystallized. From the heat of fusion, the crystallinity of the sample was estimated to be 40.5%. The Tg of the sample was increased to 61.6° C. by the crystallization.

TABLE 1

Hot Water Crystallization Data for Polytrimethylene terephthalate

| Water Temp. (° C.) | Cryst. Time | Density (g/cm³) | % Crystallinity Density | % Crystallinity DSC | DSC Cold Cryst heat (J/g) | Appearance | IV (dl/g) |
|---|---|---|---|---|---|---|---|
| NA (Control) | none | 1.3074 | 13.5 | 20.4 | 25.3 | Clear | 0.904 |
| 50 | 5 min | 1.3076 | 13.7 | 22.6 | 23.6 | Clear | 0.902 |
| 50 | 10 min | 1.3078 | 13.9 | 21.7 | 22.1 | Clear | 0.906 |
| 50 | 30 min | 1.3130 | 19.6 | 29.9 | 13.4 | Clear | 0.903 |
| 55 | 30 sec | 1.3078 | 13.9 | 24.2 | 22.1 | Clear | |
| 55 | 1 min | 1.3080 | 14.1 | 20.2 | 23.1 | Clear | |
| 55 | 5 min | 1.3100 | 16.3 | 26.3 | 19.2 | Clear | 0.908 |
| 55 | 7 min | 1.3137 | 20.3 | 24.5 | 15.1 | Hazy | 0.910 |
| 55 | 10 min | 1.3167 | 23.6 | 26.2 | 9.2 | Hazy | 0.903 |
| 55 | 20 min | 1.3234 | 30.9 | 34.3 | 5.2 | Translucent | 0.906 |
| 60 | 30 sec | 1.3085 | 14.7 | 21.0 | 24.5 | Clear | |
| 60 | 1 min | 1.3092 | 15.4 | 23.0 | 22.9 | Hazy | |
| 60 | 3 min | 1.3130 | 19.6 | 32.4 | 7.1 | Translucent | |
| 60 | 5 min | 1.3250 | 32.6 | 31.6 | 3.8 | Translucent | 0.906 |
| 60 | 7 min | 1.3262 | 33.9 | 33.3 | 3.2 | Translucent | 0.908 |
| 60 | 10 min | 1.3266 | 34.3 | 33.1 | 2.5 | Opaque | 0.906 |
| 60 | 20 min | 1.3269 | 34.6 | 34.9 | 1.8 | Opaque | 0.909 |
| 65 | 15 sec | 1.3085 | 14.7 | 23.0 | 11.8 | Clear | |
| 65 | 30 sec | 1.3180 | 25.0 | 29.8 | 1.5 | Hazy | |
| 65 | 1 min | 1.3262 | 33.9 | 31.5 | 0.8 | Translucent | 0.906 |
| 65 | 3 min | 1.3283 | 36.2 | 36.0 | 0 | Opaque | 0.907 |
| 65 | 5 min | 1.3289 | 36.8 | 37.7 | 0 | Opaque | 0.908 |
| 65 | 10 min | 1.3291 | 37.1 | 36.3 | 0 | Opaque | 0.904 |
| 65 | 20 min | 1.3293 | 37.3 | 36.9 | 0 | Opaque | 0.905 |
| 70 | 5 sec | 1.3079 | 14.0 | 22.3 | 24.5 | Clear | |
| 70 | 10 sec | 1.3100 | 16.3 | 21.1 | 20.8 | Hazy | |
| 70 | 15 sec | 1.3214 | 28.7 | 29.8 | 10.7 | Translucent | |
| 70 | 30 sec | 1.3282 | 36.1 | 37.5 | 0 | Opaque | |
| 70 | 1 min | 1.3287 | 36.6 | 36.8 | 0 | Opaque | 0.906 |
| 70 | 3 min | 1.3295 | 37.5 | 35.8 | 0 | Opaque | 0.907 |
| 70 | 5 min | 1.3300 | 38.0 | 38.0 | 0 | Opaque | 0.907 |
| 70 | 7 min | 1.3304 | 38.5 | 38.6 | 0 | Opaque | 0.906 |
| 70 | 10 min | 1.3307 | 38.8 | 37.9 | 0 | Opaque | 0.902 |
| 70 | 20 min | 1.3307 | 38.8 | 37.6 | 0 | Opaque | 0.905 |
| 80 | 3 sec | 1.3120 | 18.5 | 26.1 | 19.2 | Hazy | |
| 80 | 5 sec | 1.3145 | 21.2 | 24.0 | 20.6 | Translucent | |
| 80 | 10 sec | 1.3295 | 37.5 | 40.5 | 0 | Opaque | |
| 80 | 15 sec | 1.3307 | 38.8 | 38.6 | 0 | Opaque | |
| 80 | 30 sec | 1.3310 | 39.1 | 39.1 | 0 | Opaque | |

TABLE 1-continued

Hot Water Crystallization Data for Polytrimethylene terephthalate

| Water Temp. (°C.) | Cryst. Time | Density (g/cm³) | % Crystallinity Density | % Crystallinity DSC | DSC Cold Cryst heat (J/g) | Appearance | IV (dl/g) |
|---|---|---|---|---|---|---|---|
| 80 | 1 min | 1.3315 | 39.6 | 35.4 | 0 | Opaque | 0.902 |
| 80 | 3 min | 1.3323 | 40.5 | 39.5 | 0 | Opaque | 0.904 |
| 80 | 5 min | 1.3326 | 40.9 | 37.9 | 0 | Opaque | 0.905 |
| 80 | 7 min | 1.3327 | 40.9 | 40.7 | 0 | Opaque | 0.903 |
| 80 | 10 min | 1.3326 | 40.9 | 39.8 | 0 | Opaque | 0.904 |
| 80 | 20 min | 1.3329 | 40.9 | 38.7 | 0 | Opaque | 0.903 |
| 90 | 3 sec | 1.3200 | 27.2 | 29.9 | 12.4 | Translucent | |
| 90 | 5 sec | 1.3304 | 38.5 | 36.3 | 0 | Opaque | |
| 90 | 10 sec | 1.3310 | 39.1 | 36.6 | 0 | Opaque | |
| 90 | 15 sec | 1.3315 | 39.7 | 37.8 | 0 | Opaque | |
| 90 | 30 sec | 1.3320 | 40.2 | 36.1 | 0 | Opaque | |
| 90 | 1 min | 1.3325 | 40.8 | 37.6 | 0 | Opaque | 0.904 |
| 90 | 3 min | 1.3330 | 41.3 | 37.0 | 0 | Opaque | 0.905 |
| 90 | 5 min | 1.3332 | 41.5 | 38.9 | 0 | Opaque | 0.903 |
| 90 | 7 min | 1.3335 | 41.8 | 40.1 | 0 | Opaque | 0.904 |
| 90 | 10 min | 1.3337 | 41.8 | 39.8 | 0 | Opaque | 0.903 |
| 90 | 20 min | 1.3336 | 42.0 | 40.5 | 0 | Opaque | 0.900 |
| 100 | 3 sec | 1.3318 | 40.0 | 30.1 | 0 | Opaque | |
| 100 | 5 sec | 1.3323 | 40.5 | 36.3 | 0 | Opaque | |
| 100 | 10 sec | 1.3327 | 41.0 | 36.7 | 0 | Opaque | |
| 100 | 15 sec | 1.3330 | 41.3 | 40.0 | 0 | Opaque | |
| 100 | 30 sec | 1.3335 | 41.8 | 35.6 | 0 | Opaque | |
| 100 | 1 min | 1.3338 | 42.2 | 38.5 | 0 | Opaque | 0.903 |
| 100 | 3 min | 1.3342 | 42.6 | 27.7 | 0 | Opaque | 0.901 |
| 100 | 5 min | 1.3344 | 42.8 | 41.6 | 0 | Opaque | 0.898 |
| 100 | 7 min | 1.3345 | 42.9 | 37.7 | 0 | Opaque | 0.894 |
| 100 | 10 min | 1.3345 | 42.9 | 39.8 | 0 | Opaque | 0.897 |
| 100 | 20 min | 1.3347 | 43.2 | 40.2 | 0 | Opaque | 0.898 |
| 80 | 3 sec | 1.3120 | 18.5 | 26.1 | 19.2 | Hazy | |
| 80 | 5 sec | 1.3145 | 21.2 | 24.0 | 20.6 | Translucent | |
| 80 | 10 sec | 1.3295 | 37.5 | 40.5 | 0 | Opaque | |
| 80 | 15 sec | 1.3307 | 38.8 | 38.6 | 0 | Opaque | |
| 80 | 30 sec | 1.3310 | 39.1 | 39.1 | 0 | Opaque | |
| 80 | 1 min | 1.3315 | 39.6 | 35.4 | 0 | Opaque | 0.902 |
| 80 | 3 min | 1.3323 | 40.5 | 39.5 | 0 | Opaque | 0.904 |
| 80 | 5 min | 1.3326 | 40.9 | 37.9 | 0 | Opaque | 0.905 |
| 80 | 7 min | 1.3327 | 40.9 | 40.7 | 0 | Opaque | 0.903 |
| 80 | 10 min | 1.3326 | 40.9 | 39.8 | 0 | Opaque | 0.904 |
| 80 | 20 min | 1.3329 | 40.9 | 38.7 | 0 | Opaque | 0.903 |
| 90 | 3 sec | 1.3200 | 27.2 | 29.9 | 12.4 | Translucent | |
| 90 | 5 sec | 1.3304 | 38.5 | 36.3 | 0 | Opaque | |
| 90 | 10 sec | 1.3310 | 39.1 | 39.6 | 0 | Opaque | |
| 90 | 15 sec | 1.3315 | 39.7 | 27.8 | 0 | Opaque | |
| 90 | 30 sec | 1.3320 | 40.2 | 36.1 | 0 | Opaque | |
| 90 | 1 min | 1.3325 | 40.8 | 37.6 | 0 | Opaque | 0.904 |
| 90 | 3 min | 1.3330 | 41.3 | 37.0 | 0 | Opaque | 0.905 |
| 90 | 5 min | 1.3332 | 41.5 | 38.9 | 0 | Opaque | 0.903 |
| 90 | 7 min | 1.3335 | 41.8 | 40.1 | 0 | Opaque | 0.904 |
| 90 | 10 min | 1.3337 | 41.8 | 39.8 | 0 | Opaque | 0.903 |
| 90 | 20 min | 1.3336 | 42.0 | 40.5 | 0 | Opaque | 0.900 |
| 100 | 3 sec | 1.3318 | 40.0 | 30.1 | 0 | Opaque | |
| 100 | 5 sec | 1.3323 | 40.5 | 36.3 | 0 | Opaque | |
| 100 | 10 sec | 1.3327 | 41.0 | 36.7 | 0 | Opaque | |
| 100 | 15 sec | 1.3330 | 41.3 | 40.0 | 0 | Opaque | |
| 100 | 30 sec | 1.3335 | 41.8 | 35.6 | 0 | Opaque | |
| 100 | 1 min | 1.3338 | 42.2 | 38.5 | 0 | Opaque | 0.903 |
| 100 | 3 min | 1.3342 | 42.6 | 27.7 | 0 | Opaque | 0.901 |
| 100 | 5 min | 1.3344 | 42.8 | 41.6 | 0 | Opaque | 0.898 |
| 100 | 7 min | 1.3345 | 42.9 | 37.7 | 0 | Opaque | 0.894 |
| 100 | 10 min | 1.3345 | 42.9 | 39.8 | 0 | Opaque | 0.897 |
| 100 | 20 min | 1.3347 | 43.2 | 40.2 | 0 | Opaque | 0.898 |

We claim:

1. Apparatus for increasing the crystallinity of polytrimethylene terephthalate pellets comprising:

a vertically-elongated vessel having
 (a) at its upper end, a lateral inlet for controlled introduction of polytrimethylene terephthalate pellets in transport water in vortex flow through the upper portion thereof;
 (b) means in the upper interior portion of the vessel for separating the polytrimethylene terephthalate pellets from the transport water and for removing the transport water from the vessel;
 (c) sides which extend vertically from the top of the vessel and, in the lower portion thereof, taper inward to form a funnel which terminates in an exit for polytrimethylene terephthalate pellets from the bottom of the vessel;

(d) an inlet for controlled introduction of a heated aqueous liquid into the funnel end of the vessel; and (e) means for opening and closing said exit to provide controlled flow of partially-crystallized pellets therefrom.

* * * * *